United States Patent [19]

Han

[11] Patent Number: 5,150,212

[45] Date of Patent: Sep. 22, 1992

[54] CONTROL SYSTEM FOR RECORDING AND REPRODUCING A PLURALITY OF VIDEO SIGNALS

[75] Inventor: Hyeong-deok Han, Suwon, Rep. of Korea

[73] Assignee: Samsung Electronics Co., Ltd., Kyunggi, Rep. of Korea

[21] Appl. No.: 634,356

[22] Filed: Dec. 31, 1990

[30] Foreign Application Priority Data

Dec. 31, 1989 [KR] Rep. of Korea .................. 89-20723

[51] Int. Cl.⁵ .......................... H04N 7/04; H04N 7/18
[52] U.S. Cl. .................................... 358/147; 358/181; 358/108
[58] Field of Search ............... 358/108, 181, 147, 146, 358/142; 307/463, 480, 445; 360/18, 24, 27, 35.1

[56] References Cited

U.S. PATENT DOCUMENTS

| | | | |
|---|---|---|---|
| 3,472,949 | 10/1969 | Banning, Jr. et al. | 358/108 |
| 4,198,656 | 4/1980 | Mathisen | 358/127 |
| 4,673,974 | 6/1987 | Ito et al. | 358/108 |
| 4,943,864 | 7/1990 | Elderbaum | 358/108 |
| 4,994,916 | 2/1991 | Pshtissky et al. | 358/181 |
| 5,019,905 | 5/1991 | Pshtissky et al. | 358/146 |

FOREIGN PATENT DOCUMENTS

2109198 4/1990 Japan .................. 358/108

*Primary Examiner*—James J. Groody
*Assistant Examiner*—Safet Metjahic
*Attorney, Agent, or Firm*—Cushman, Darby & Cushman

[57] ABSTRACT

The present invention is a video signal controller which can operate in one of two modes; play back mode and recording mode. Each camera has its own assigned display monitor and address code sequence. During operation of the video controller, each video signal is combined with its corresponding address signal that identifies from which camera the video signal is originally generated. The video signal and each address signal are then recorded via VTR onto a video tape. When the video signal controller is in play back mode, it extracts the synchronization signal and address signals from signals outputted by the VTR. The address signal and synchronization signals are used to locate and identify proper monitor to display its corresponding segment of signals from the VTR. Each monitor then plays back only those signals generated from its corresponding camera.

6 Claims, 6 Drawing Sheets

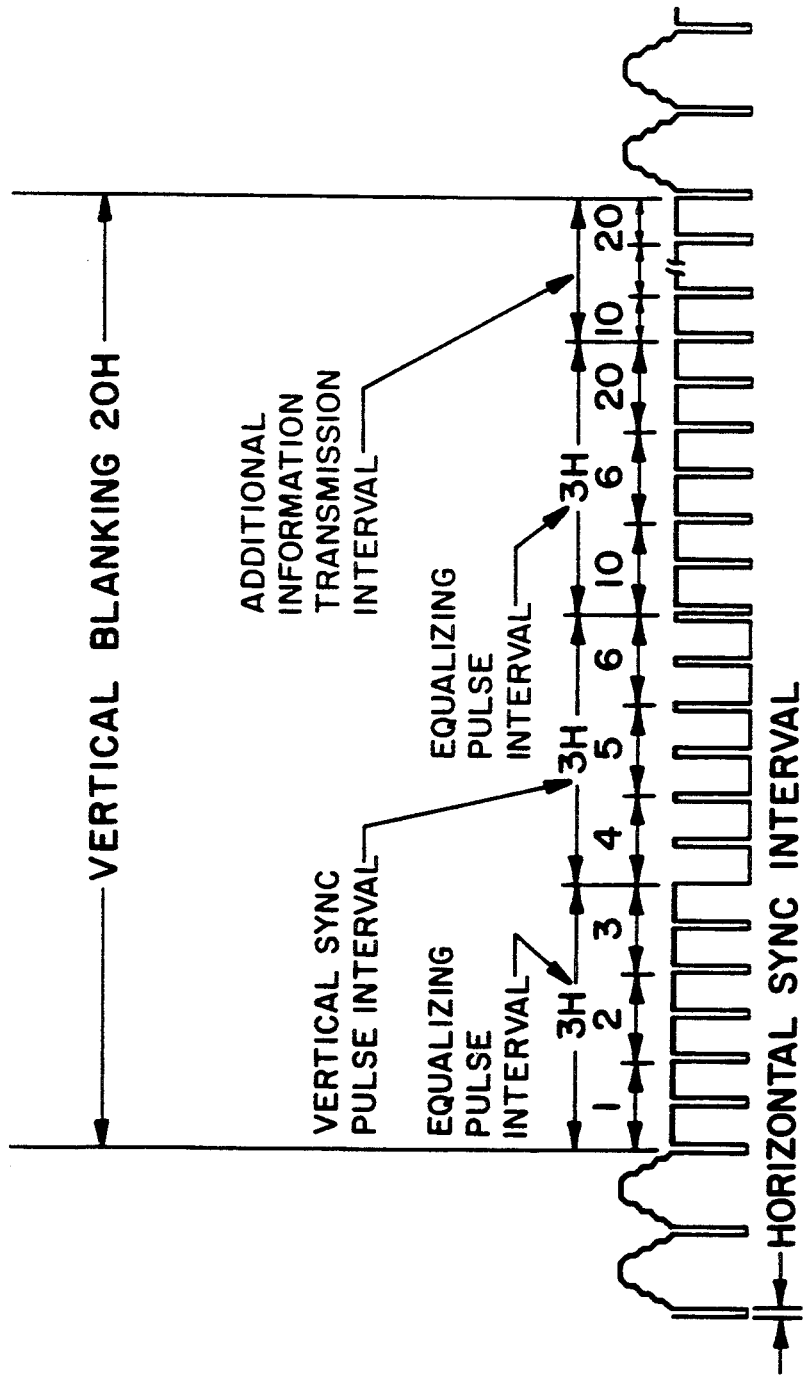

CONTROL SYSTEM FOR RECORDING AND REPRODUCING A PLURALITY OF VIDEO SIGNALS

BACKGROUND OF THE INVENTION

Field of the Invention

The present invention relates to a control system for multiple video signal recording or playing. The controller allows video signals from multiple cameras to be recorded onto a single tape, and allows the recorded video signals to be played back on numerous monitors.

Conventionally, multiple cameras can be connected to a switch, which, in turn, is connected to a single VTR. Thus, multiple video inputs can be recorded onto a single tape. However, a single VTR deck with a single tape cannot transmit separate and independent signals, each of which is from different cameras, to each of a number of monitors.

SUMMARY OF THE INVENTION

It is the object of the present invention, in a system where an independent monitor is assigned to each of multiple cameras, to allow:

recording of multiple video signals from each camera onto a single tape; and each monitor to play back only those signals originally generated from its corresponding camera.

The present invention is a video signal controller which can operate in one of two modes; playing back mode and recording mode. In recording mode, the video signal controller provides sync signals to cameras and introduces "address signals" to video outputs from cameras. Each camera has its own assigned address code sequence; thus, the address signal within an actual video signal identifies the camera from which each video signal is originally generated. The video signal and each address signal are then recorded via VTR onto a video tape.

When the video signal controller is in playing back mode, it extracts the synchronization signal and address signals from the output of the VTR. The synchronization signal needs to be obtained because the synchronization signal provides a reference point by which each addressing signal can be read (i. e., locates the beginning and the end of each address). The address signal locates and identifies proper monitor to display its subsequent signals from the VTR. Each monitor then plays back only those signals originally generated from its corresponding camera.

The main advantage of the present invention is that it allows a single video tape to record signals from multiple cameras and distributively plays the signals back on multiple monitors.

BRIEF DESCRIPTION OF THE DRAWINGS

FIG. 4, 5, and 6 shows waveforms at various points in the diagram shown in FIG. 2.

DETAILED DESCRIPTION OF THE PREFERRED EMBODIMENT

Recording Mode

Figure 1:
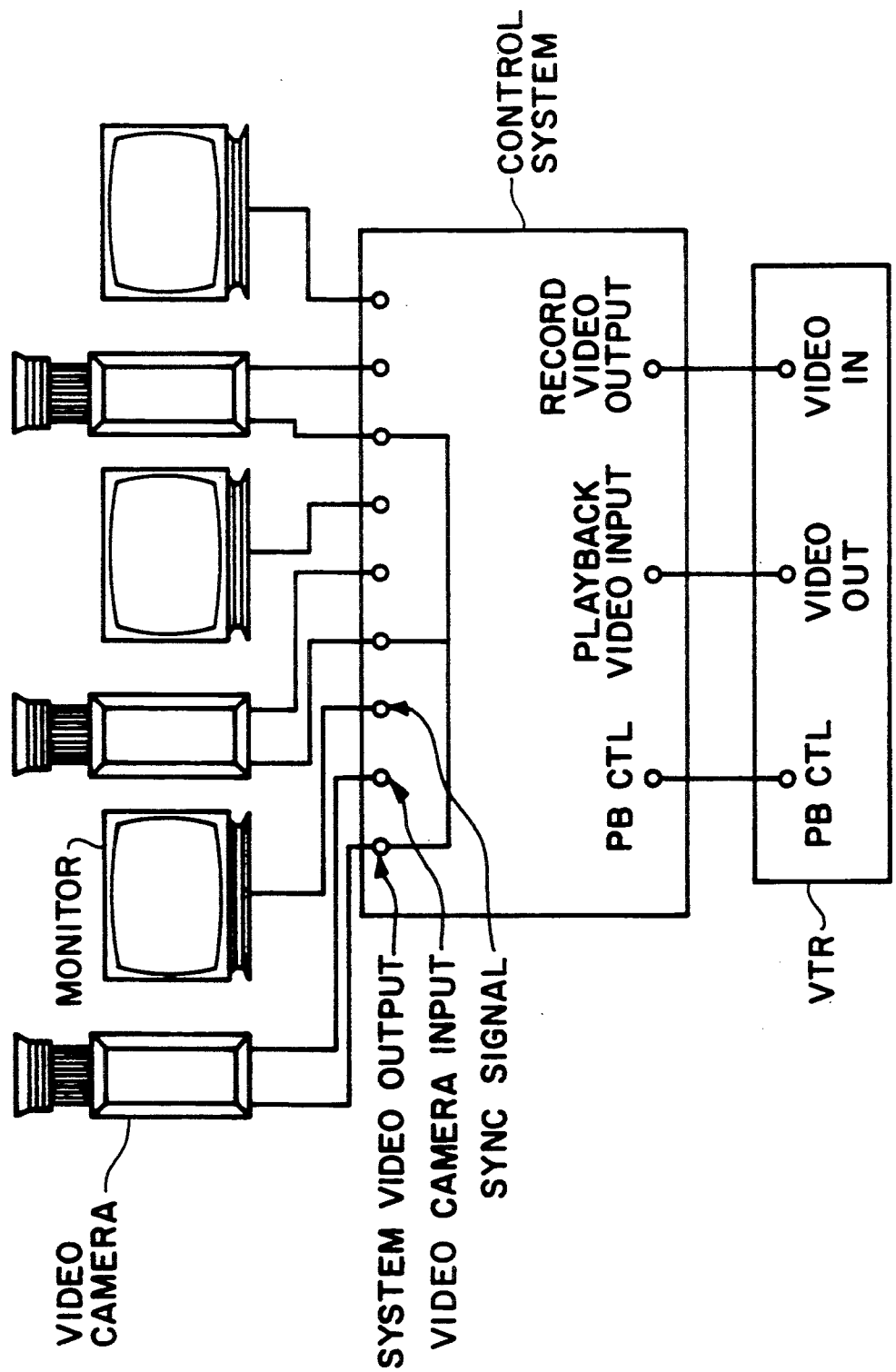
FIG. 1 shows one configuration of the present embodiment. In the figure, three cameras and three monitors are connected to a single VTR and a single control system.

One embodiment of video recording/playing system that is connected to the video signal controller according to the present invention is shown in FIG. 1. In the figure, three video cameras and each of its corresponding monitors are connected to the video signal controller. The output from the controller feeds into a VTR deck.

Figure 2:
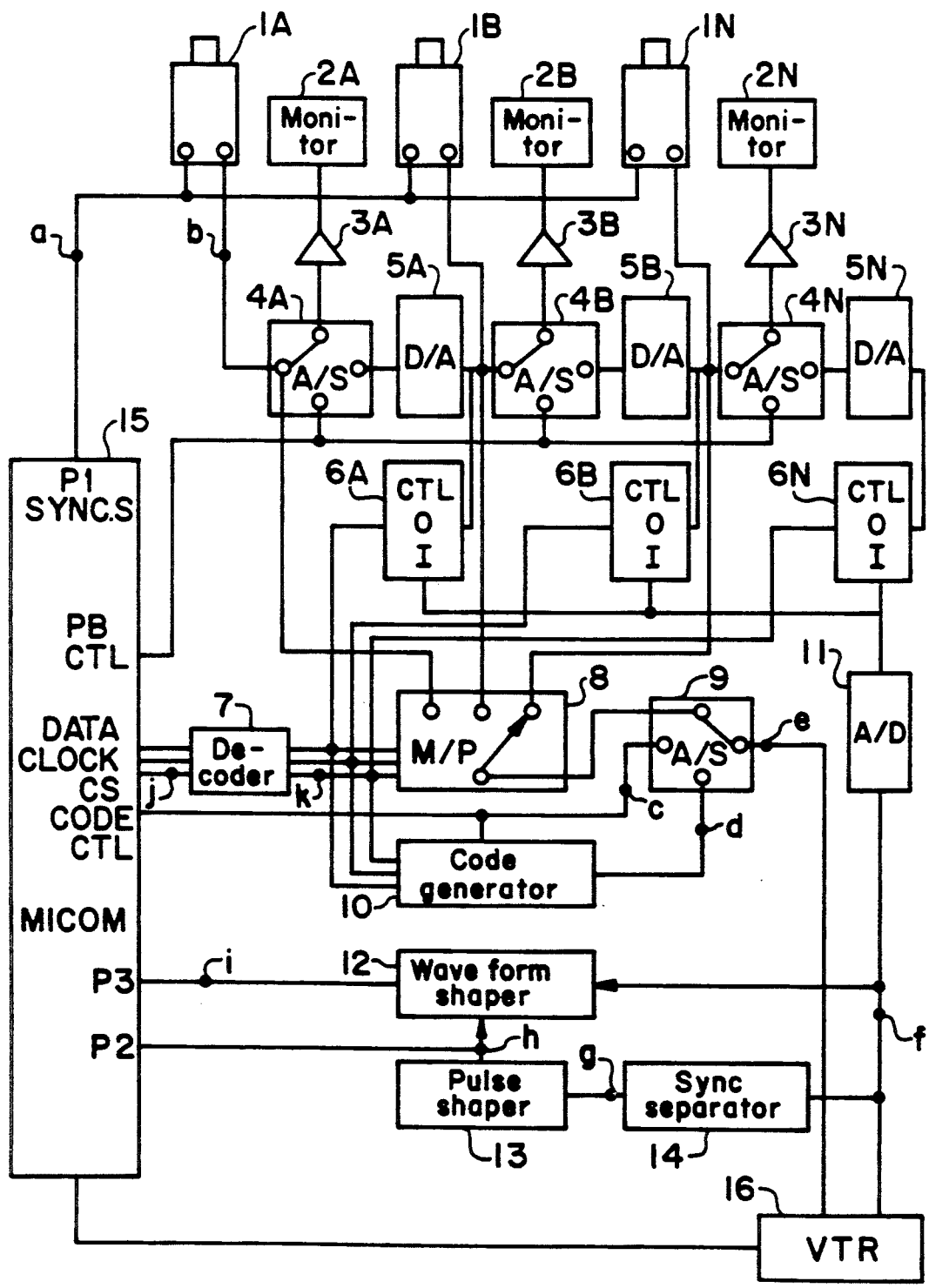
FIG. 2 illustrates a block diagram of the present invention.

FIG. 2 shows a block diagram of the present invention, as well as the VTR, the three cameras, and the three monitors.

The heart of the controller is the microcomputer 15. In the recording mode, it provides synchronization signal to the cameras 1A, 1B, and 1N via its output port P1 Sync. The output from each of video cameras 1A, 1B, and 1N contains a vertical blanking signal, whose locations of the vertical blanking signals from all cameras are produced relative to the synchronization signal. The vertical blanking signal has a format shown in FIG. 4. The synchronization signal is used as a timing signal to keep video blanking signals outputted from all cameras 1A, 1B, and 1C in phase.

During the recording, the video controller replaces a portion of the blanking signal by an address signal that identifies the camera from which the blanking signal originates. The addressing scheme works as follows.

First, each vertical blanking signal generated from cameras 1A, 1B, and 1N is routed to analog switches (A/S switch) 4A, 4B, and 4N corresponding to each camera. Each of switches 4A, 4B, and 4N selects particular signal paths depending on the PB CTL signal, which specifies whether the control system is in play back mode or in recording mode.

In recording mode, all signals from the video cameras are transmitted to multiplexer 8, which chooses the signal from the camera selected by microcomputer 15.

To record a signal from the selected camera, microcomputer 15, multiplexer 8, decoder 7, and code generator 10 work in coordination to perform the following.

1. Depending on DATA, CLOCK, and ~CS signals from the microcomputer 15, decoder 7 outputs a signal which addresses the selected camera.
2. Multiplexer 8 selects the signal originating from the selected camera, whose address is specified by the output from decoder 7.
3. Microcomputer outputs the code CTL signal, which has two states.
   1) In the first state, as soon as decoder 7 outputs a signal that designates the selected camera, code CTL signal prompts switch 9 to select the output from code generator 10. Code generator 10 then produces serial data, consisting of three bits, that identifies which camera has been selected. As soon as switch 9 connects the output port of code generator 10 to VTR 16, the VTR records the outputted code, previously referred to as the address signal.
   2) In the second state, code CTL drives switch 9 to select the output from multiplexer 8. The output from multiplexer is then connected to VTR 16, so that VTR 16 can record subsequent signals from the selected camera.

The second state immediately follows the first state.

Figure 5:
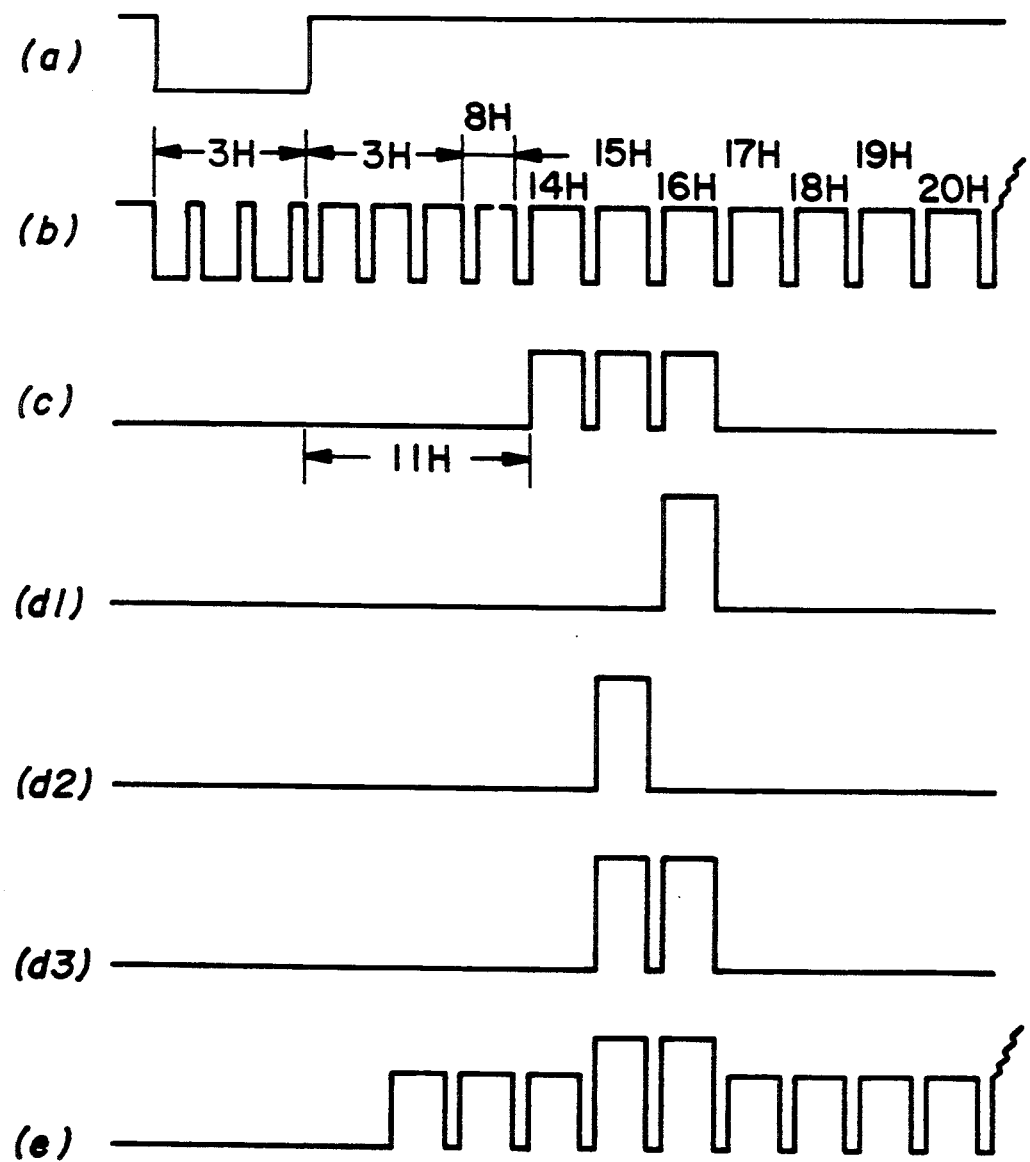

4. Code generator 10 generates a unique sequence of address code for each of cameras 1A 1B, and 1N. Because switch 9 routes the output of code generator 10 instead of that from multiplexer 8 to the VTR while a particular segment of the blanking signal is being transmitted, the code from generator 10 replaces the particular segment of the blanking signal. In other words, address signal (otherwise called code control signal) is spliced within the vertical blanking portion of the video signal. FIG. 5 shows waveforms at various points in FIG. 2 during the splicing process. Each signal is labelled as follows.

(a) shows the synchronization signal generated at P1 Sync. output port of microcomputer 15.

(b) shows the video blanking signal from a video camera.

(c) shows the code CTL signal outputted from microcomputer 15.

Figure 3A:
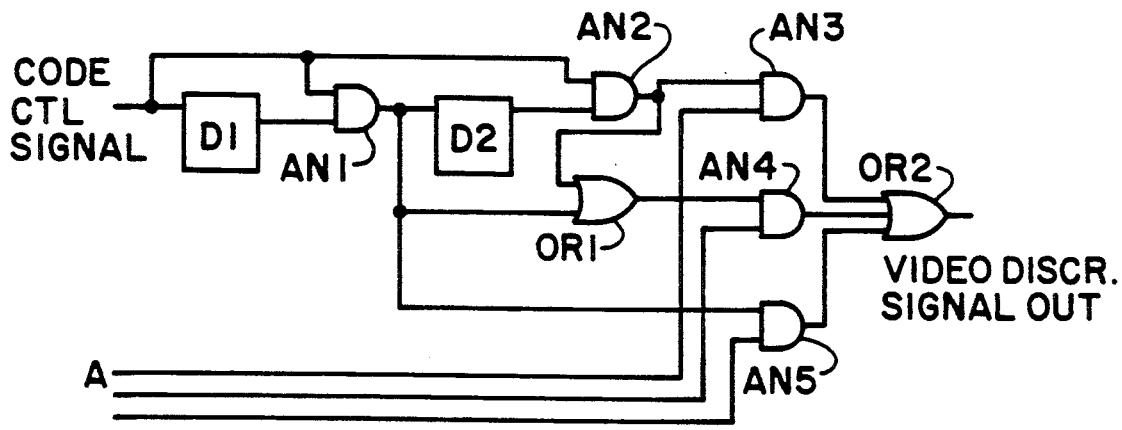
FIG. 3 shows a detailed block diagram of a code generator and its associated signals at various points within, the code generator being part of the video controller according to the present invention.

(d1), (d2) and (d3) show address signals generated for video cameras 1A, 1B, and 1N, respectively, and corresponding to the outputs of AND-gates AN3, AN5 and AN4 of code generator 10 (See FIG. 3A).

(e) shows the output of analog switch 9, with address signal spliced within its associated video blanking signal.

Switch 9 transmits a sequence of address signals and its associated video signals (from cameras) to VTR 16, which records all received signals onto a single tape. Thus, signals associated with camera 1A would be recorded on a given segment within the tape, then signals associated with camera 1B on the next segment, followed by signals from camera 1N on the following segment. Just after the signals from camera 1N are recorded, again, signals from 1A would follow, and so forth.

The format of the vertical blanking signal (otherwise called TV video broadcasting video signal) outputted from each camera is shown in FIG. 4. The spliced portion of the video broadcasting signal is within Additional Information Transmission Interval, from 10H to 20H (meaning of the unit "H" is explained in the last section of the present specification). Specifically, address signals occupy 14H, 15H, and 16H locations within the Interval. Values of bits occupying 14H, 15H, and 16H for addressing each of the cameras A, B, and N are shown on Table 1.

TABLE I

|          | 14H | 15H | 16H |
|----------|-----|-----|-----|
| Camera A | Lo  | Lo  | Hi  |
| Camera B | Lo  | Hi  | Lo  |
| Camera N | Hi  | Lo  | Lo  |

In addition, pulse peaks (or bit values) of address signals are generated in accordance with the following rules.

1. If the desired value of pulse is Hi then, pulse peak > 100 IRE = (0.75).
2. If the desired value of pulse is Lo then, pulse peak = 1 to 10 IRE.

In play back mode, to interpret a peak value of pulse as either Lo or Hi, the following rules are used.

1. A voltage value corresponding to the difference between Hi level and Lo level is divided into three equal segments.

2. If the actual peak voltage of a pulse lands within the low ⅓ segment, the signal pulse is interpreted as having Lo value.
3. If the actual peak voltage of a pulse lands within the middle ⅓ segment, the signal pulse is interpreted as having an unknown, or "error" value.
4. If the actual peak voltage of a pulse lands within the high ⅓ segment, the signal pulse is interpreted as having Hi value.

Figure 3B:
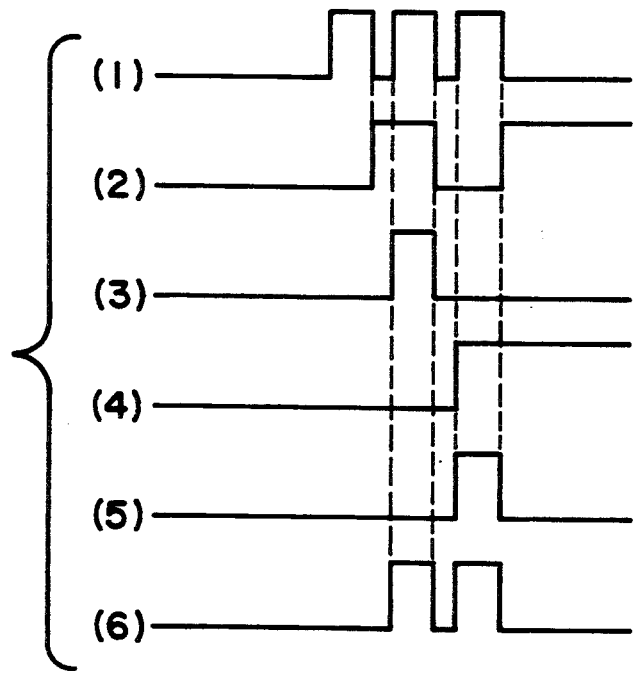

A code generator 10 is used to produce an address signal for each video signal. One implementation of code generator 10 is shown in FIG. 3 (a). FIG. 3 (b) illustrates signals at various points in code generator 10 as follows.

(1) is a code CTL signal from the microcomputer 15.
(2) is the output of the ½ frequency divider D1. The frequency divider is inputted with code CTL signal.
(3) is a video code signal B which is the output signal of AND-gate AN1.
(4) is the D2 frequency divided signal of the output signal from AND-gate AN1.
(5) is a video code signal A which is the output of the AND-gate AN2.
(6) is a video code signal N which is the output of the OR-gate OR1.

When code CTL signal is at Hi level, code generator 10 produces an address signal (or video discriminating signal or video code signal). As it is evident from FIG. 3, when CTL signal attains Hi level, frequency divider D1 first halves the frequency of CTL signal. The output of the divider D1 is then AND-ed with CTL signal itself to generate serial data, which, when AND-ed with signal N (at Hi) produces the address signal for camera 1N. Other address signals for cameras 1A and 1B are generated similarly.

Detailed description of decoder 7 is omitted. It is noted, however, even though FIG. 2 shows decoder 7 as being independent from microcomputer 15, the output signal of decoder 7 can be generated directly from microcomputer 15 and routed to multiplexer 8, code generator 10, and memory modules 6A, 6B, and 6C.

Play Back Mode

In play back mode, output signal f from VTR 16 is fed into sync separator 14, which reads signal f from VTR 16 and isolates the address signals contained therein. The replayed address signals are then reshaped at the pulse shaper 13. Meanwhile, address signals and signal f are inputted to waveform shaper 12 to generate replay sync. signals. The replay sync. signals are at Hi values only during 14H through 16H of a replayed vertical blanking signal.

Figure 6:
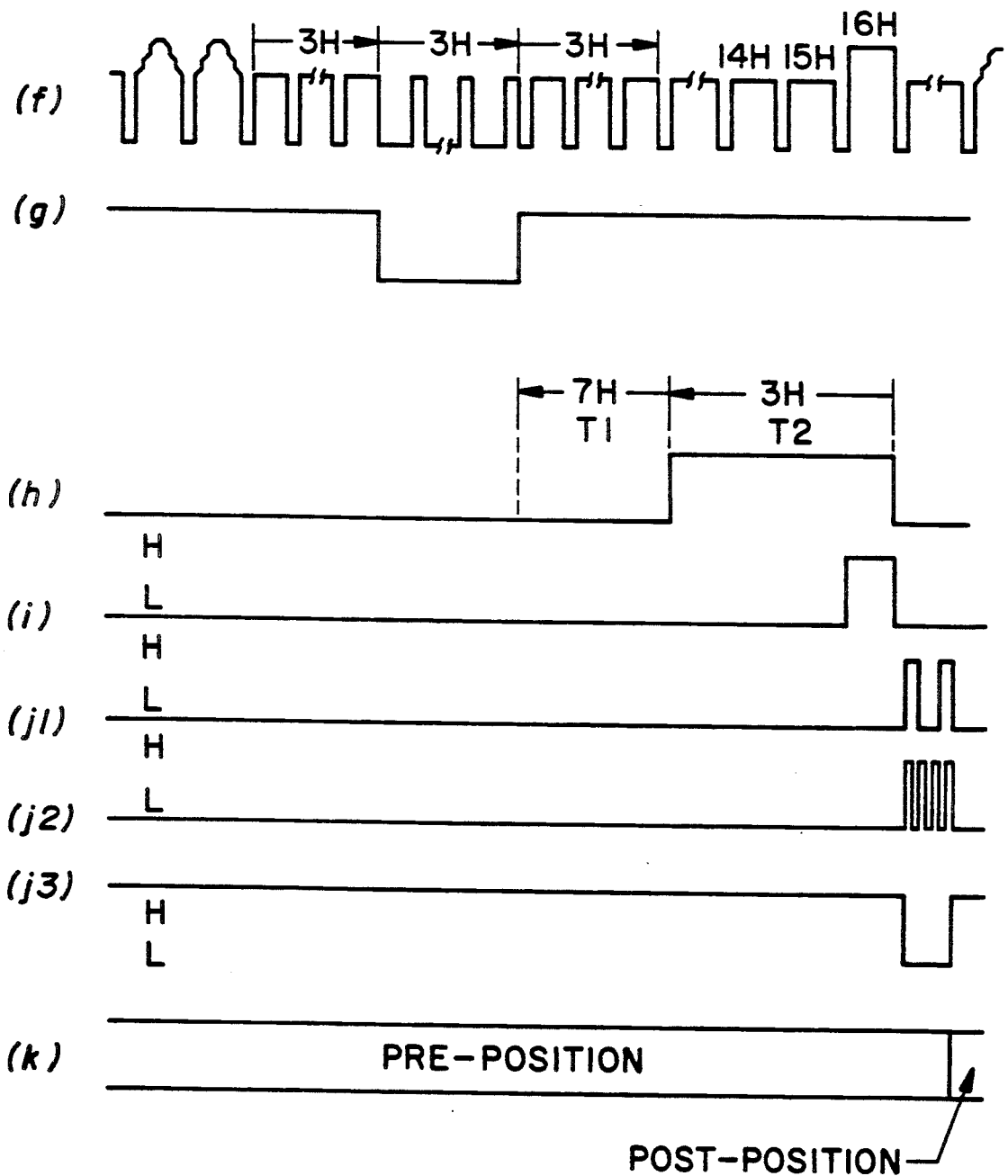

In play back mode, signals from both pulse shaper 13 and waveform shaper 12 provide reference timing signals for microcomputer 15, which, in response, generates signals at output lines DATA, CLOCK, and ~CS. FIG. 6 illustrates output signals from just described circuit blocks (FIG. 2) as follows:

(f) indicates reproduced video blanking signal from VTR 16.
(g) shows replay sync. signal at the output of waveform shaper 12.
(i) shows a reproduced address signal at the output of pulse shaper 13
(j1), (j2), and (j3) show signals from DATA, CLOCK, and ~CS output lines of microcomputer 15.

(k) illustrates output waveform of decoder 7.

Signals from DATA, CLOCK, and CS lines are inputted to decoder 7, which then outputs timed enable signal to one of memory blocks 6A, 6B, and 6C.

A/D converter 11 supplies other inputs to memory blocks 6A, 6B, and 6C after converting signal f from VTR 16 into digital signals. Whenever an address signal (from decoder 7) to a particular memory block 6A, 6B, or 6N becomes Hi, digital signal from A/D converter 11 is memorized by the selected block. When the address signal assumes the value Lo, the selected memory block transmits its signals to its corresponding D/A converter (5A, 5B, or 5C). The signal from decoder 7 is set so that its so that each of memory blocks 6A, 6B, and 6C only memorizes the part of signal (from A/D converter 11) that has been originally produced from its corresponding camera. For example, memory block 6A would memorize only the part of the signal (outputted from A/D converter 11) that contains the original signal produced by camera 1A. In any case, using memory blocks 6A, 6B, and 6C to store signals allows the monitors 2A, 2B, and 2C to display continuous video signals without blanking.

Upon reception of signals from one of memory blocks, corresponding D/A converter outputs signals via an analog switch (one of 4A, 4B, and 4C) to a buffer (3A, 3B, or 3C). Buffers 3A, 3B, and 3C sends received signals to monitors 2A, 2B, and 2C, respectively.

Notes on Units and Values of Some Constants and Signals

The following notes seek to explain meanings of various constants and parameters used in the present invention. Other embodiments of the present invention may employ a different set of parameters.

1. The duration of time between two consecutive address signals [at the output of switch 9 (FIG. 2)] is 1/60 second.
2. Buffers 3A, 3B, and 3N outputs video signals having 1 volt peak-to-peak at 75 ohms.
3. Code CTL signal from microcomputer 15 is delayed by 11H from the rising edge of a synchronization pulse generated at P1 Sync output of microcomputer 15.
4. Each address signal is delayed from the rising edge of a replay sync signal [FIG. 6 (h)] by ½ Tn, where Tn=the vertical sync signal period=63.5 microseconds.
5. One unit of H is equal to 63.5 microseconds. Thus, H=Tn=63.5 microseconds

What is claimed is:

1. A control system for controlling recording of video signals and for controlling reproduction of the recorded video signals, the control system comprising:

mixing means for processing at least first and second video signals outputted from at least first and second video cameras respectively and for transmitting the processed signals to a video recording/playing apparatus, which then records the processed signals;

separating means for receiving the recorded signals from the video recording/playing apparatus and extracting and isolating from the recorded signals said at least first and second video signals and transmitting the isolated signals to corresponding first and second video monitors;

a microcomputer responsive to signals from said mixing means and said separating means for generating timing signals to various elements within said mixing means and said separating means; and a decoder for generating decoding signals in response to at least some of said timing signals from said microcomputer, wherein said mixing means comprises:

a multiplexer for multiplexing the video signals output from said video cameras in response to said decoding signals;

a code generator for receiving at least some of said timing signals from said microcomputer and said decoding signals and generating an output address signal; and an analog switch responsive to said at least some of said timing signals output from said microcomputer for selectively switching control between the generated output address signal from said code generator and the multiplexed video signals from said multiplexer, and for transmitting the selectively switched signals to said video recording/playing apparatus.

2. A control system as in claim 1, wherein said code generator comprises:

first ½ frequency divider means for accepting a control signal from said microcomputer and outputting a first frequency-divided signal in response thereto;

a first AND-gate for accepting said first frequency divided signal and said control signal and outputting a logical-AND in response thereto;

second ½ frequency divider means for accepting the output from the first AND-gate and outputting a second frequency-divided signal in response thereto;

a second AND-gate for accepting the second frequency-divided signal and said control signal and outputting a logical-AND in response thereto;

a first OR-gate for accepting the output from the first AND-gate and the output from the second AND-gate and outputting a logical-OR in response thereto;

a third AND-gate for accepting the output from the second AND-gate and a first output line from said decoder;

a fourth AND-gate for accepting the output from the first OR-gate and a second output line from said decoder;

a fifth AND-gate for accepting the output from the first AND-gate and a third output line from said decoder; and a second OR-gate for accepting as its inputs the outputs from the third, the fourth, and the fifth AND-gates and outputting logical-OR of its inputs, wherein the output from the second OR-gate is said address signal.

3. A control system for controlling recording of video signals and for controlling reproduction of the recorded video signals, the control system comprising:

mixing means for processing at least first and second video signals outputted from at least first and second video cameras respectively and for transmitting the processed signals to a video recording/playing apparatus, which then records the processed signals;

separating means for receiving the recorded signals from the video recording/playing apparatus and extracting and isolating from the recorded signals said at least first and second video signals and transmitting the isolated signals to corresponding first and second video monitors;

a microcomputer responsive to signals from said mixing means and said separating means for generating timing signals to various elements within said mixing means and said separating means; and a decoder for generating decoding signals in response to at least some of said timing signals from said microcomputer, wherein said mixing means comprises:

an A/D converter for converting said recorded signals into digital signals;

a plurality of memories corresponding to the number of video monitors, each memory for receiving its own address signal, and, in response to the reception of its own address signal, accepting said digital signals from said A/D converter;

a plurality of D/A converters corresponding to the number of said memories, each D/A converter for converting the digital signals, outputted from its corresponding memory, into an analog signal;

a plurality of analog switches corresponding to the number of said D/A converters, each switch for selecting one of two signals, said analog signal from its corresponding D/A converter and video signals from said video monitors, in response to control signals from said microcomputer;

a plurality of buffers corresponding to the number of said analog switches, each buffer for receiving the selected signal from its corresponding analog switch, for reshaping its received signal, and outputting the reshaped signal to its corresponding monitor;

a sync separator for accepting said recorded signals, extracting a synchronization signal from the recorded signals, and outputting a sync signal;

a pulse shaper for receiving the sync signal from the sync separator and outputting a reshaped signal to the waveform shaper and to one input port of said microcomputer; and a waveform shaper for receiving said recorded signals and the sync signal and outputting the reproduced address signals to another input port of said microcomputer.

4. A control system for controlling recording of video signals and for controlling reproduction of the recorded video signals, the control system comprising:

mixing means for processing at least first and second video signals outputted from at least first and second video cameras respectively and for transmitting the processed signals to a video recording/playing apparatus, which then records the processed signals;

separating means for receiving the recorded signals from the video recording/playing apparatus and extracting and isolating from the recorded signals said at least first and second video signals and transmitting the isolated signals to corresponding first and second video monitors; and a microcomputer responsive to signals from said mixing means and said separating means for generating timing signals to various elements within said mixing means and said separating means, wherein said mixing means comprises:

a multiplexer for multiplexing the video signals output from said video cameras in response to said timing signals;

a code generator for receiving said timing signals from said microcomputer and generating an output address signal; and an analog switch responsive to said timing signals output from said microcomputer for selectively switching control between the generated output address signal from said code generator and the multiplexed video signals from said multiplexer, and for transmitting the selectively switched signals to said video recording/playing apparatus.

5. A control system as in claim 4, wherein said code generator comprises:

first ½ frequency divider means for accepting a control signal from said microcomputer and outputting a first frequency-divided signal in response thereto;

a first AND-gate for accepting said first frequency divided signal and said control signal and outputting a logical-AND in response thereto;

second ½ frequency divider means for accepting the output from the first AND-gate and outputting a second frequency-divided signal in response thereto;

a second AND-gate for accepting the second frequency-divided signal and said control signal and outputting a logical-AND in response thereto;

a first OR-gate for accepting the output from the first AND-gate and the output from the second AND-gate and outputting a logical-OR in response thereto;

a third AND-gate for accepting the output from the second AND-gate and a first output line from said decoder;

a fourth AND-gate for accepting the output from the first OR-gate and a second output line from said decoder;

a fifth AND-gate for accepting the output from the first AND-gate and a third output line from said decoder; and a second OR-gate for accepting as its inputs the outputs from the third, the fourth, and the fifth AND-gates and outputting logical-OR of its inputs, wherein the output from the second OR-gate is said address signal.

6. A control system for controlling recording of video signals and for controlling reproduction of the recorded video signals, the control system comprising:

mixing means for processing at least first and second video signals outputted from at least first and second video cameras respectively and for transmitting the processed signals to a video recording/playing apparatus, which then records the processed signals;

separating means for receiving the recorded signals from the video recording/playing apparatus and extracting and isolating from the recorded signals said at least first and second video signals and transmitting the isolated signals to corresponding first and second video monitors; and a microcomputer responsive to signals from said mixing means and said separating means for generating timing signals to various elements within said mixing means and said separating means, wherein said mixing means comprises:

an A/D converter for converting said recorded signals into digital signals;

a plurality of memories corresponding to the number of video monitors, each memory for receiving its own address signal, and, in response to the reception of its own address signal, accepting said digital signals from said A/D converter;

a plurality of D/A converters corresponding to the number of said memories, each D/A converter for converting the digital signals, outputted from its corresponding memory, into an analog signal;

a plurality of analog switches corresponding to the number of said D/A converters, each switch for selecting one of two signals, said analog signal from its corresponding D/A converter and video signals from said video monitors, in response to control signals from said microcomputer;

a plurality of buffers corresponding to the number of said analog switches, each buffer for receiving the selected signal from its corresponding analog switch, for reshaping its received signal, and outputting the reshaped signal to its corresponding monitor;

a sync separator for accepting said recorded signals, extracting a synchronization signal from the recorded signals, and outputting a sync signal;

a pulse shaper for receiving the sync signal from the sync separator and outputting a reshaped signal to the waveform shaper and to one input port of said microcomputer; and a waveform shaper for receiving said recorded signals and the sync signal and outputting the reproduced address signals to another input port of said microcomputer.

* * * * *